US006961588B2

(12) United States Patent
Watanabe

(10) Patent No.: US 6,961,588 B2
(45) Date of Patent: Nov. 1, 2005

(54) MOBILE COMMUNICATIONS SYSTEM AND COMMUNICATIONS CONTROL METHOD AND MOBILE TERMINAL DEVICE USED THEREFOR, CONTROL METHOD THEREOF, AND RECORDING MEDIUM

(75) Inventor: Akira Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 515 days.

(21) Appl. No.: 10/223,218

(22) Filed: Aug. 20, 2002

(65) Prior Publication Data

US 2003/0050076 A1    Mar. 13, 2003

(30) Foreign Application Priority Data

Aug. 22, 2001  (JP)  ............................ 2001-250951

(51) Int. Cl.[7] ............................. H04Q 7/20; H04B 1/38
(52) U.S. Cl. ....................... 455/560; 455/433; 370/352
(58) Field of Search ............................... 455/560, 436, 455/433, 435.1, 435.2; 370/352

(56) References Cited

U.S. PATENT DOCUMENTS

2001/0034231 A1 * 10/2001 Palat et al. ................. 455/433
2004/0029614 A1 *  2/2004 Back et al. ................. 455/560

FOREIGN PATENT DOCUMENTS

| JP | 11-145972 A | 5/1999 |
| WO | WO 00/16571 A2 | 3/2000 |
| WO | WO 01/10080 A2 | 2/2001 |
| WO | WO 02/01905 A1 | 1/2002 |

OTHER PUBLICATIONS

"W-CDMA Mobile Communications Modes", published by Maruzen Co., Ltd. (Jun. 25, 2001).

* cited by examiner

Primary Examiner—Erika A. Gary
(74) Attorney, Agent, or Firm—Sughrue Mion, PLLC

(57) ABSTRACT

To reduce a time required for an attach process or a location registration process and to alleviate traffic congestion in a W-CDMA mobile communications system. When an attach process or location registration process takes place on a UE with respect to both a circuit switched domain and a packet switched domain, messages about the attach process or the location registration process are transmitted from the UE to the circuit switched domain and the packet switched domain through an RRC (Radio Resource Control) connection established between the UE and a radio access network device (i.e., a RAN). This makes it possible to update location information for mobility management in both circuit switched domain and packet switched domain through the RRC connection.

44 Claims, 5 Drawing Sheets

MOBILE COMMUNICATIONS SYSTEM AND COMMUNICATIONS CONTROL METHOD AND MOBILE TERMINAL DEVICE USED THEREFOR, CONTROL METHOD THEREOF, AND RECORDING MEDIUM

BACKGROUND OF THE INVENTION

1. Field of the Invention

The present invention relates to a mobile communications system, a communications control method, a mobile terminal device, a control method, and a recording medium. More particularly, it relates to a mobile communications system using W-CDMA (Wideband Code Division Multiple Access) mode.

2. Description of the Prior Art

Conventionally, mobile communications systems including portable telephones have been used effectively by users. Regarding third-generation mobile communications systems, IMT-2000 (International Mobile Telecommunication 2000) has been proposed as a global standard. In Japan, it has been stipulated as W-CDMA (Wideband Code Division Multiple Access) mode.

The W-CDMA mode covers a wider band than CDMA (Code Division Multiple Access) mode which is used in cellular systems wherein mobile stations conduct communications simultaneously in the same frequency band. The W-CDMA mode has the advantages of improving multipath resolution and reception characteristics and increasing the number of users who can communicate in the same band. Configurations of W-CDMA mobile communications systems are disclosed in "W-CDMA Mobile Communications modes" published by Maruzen Co., Ltd. (Jun. 25, 2001). FIG. 4 is a block diagram showing a configuration of a W-CDMA mobile communications system.

In FIG. 4, reference numeral 1 denotes a user equipment (UE) reference numeral 2 denotes a radio access network device which composes a radio access network (RAN), and reference numeral 3 denotes a core network (CN). The CN 3 is connected to a fixed network/mobile communications network 4 and the Internet 5. The radio access network device 2 is connected to the CN 3 and comprises a base transceiver station (BTS) 21 and radio network controller (RNC) 22. The UE 1 connects wirelessly to the BTS 21. The RNC 22 controls the BTS 21.

The CN 3 comprises a circuit switched (CS) domain 31 for switching control in relation to the fixed network/mobile communications network 4 and a packet switched (PS) domain 32 for switching control in relation to the Internet 5. The CS domain 31 comprises a mobile-services switching center (MSC) 33 and a gateway device 34. The PS domain 32 comprises a servicing general packet radio service support node (SGSN) 35 and a packet gateway device 36.

In this mobile communications system, location registration areas which correspond to BTSs are predefined. Mobility management for each communications network such as the fixed network/mobile communications network 4 or the Internet 5 is carried out by storing location information—which indicates in what location registration area the UE 1 exists—in a database which is called a home location register (HLR) (not shown) and is connected to the MSC 33 and the SGSN 35.

If the UE 1 is turned on in a location registration area or if the UE 1 is moved with its power off from a location registration area and is turned on in a new location registration area or if the UE 1 is taken from a location registration area to a different location registration area, location information must be registered or updated.

Operations for registering and updating location information have been defined in common specifications "3GPP TS 23 Series" standardized by 3GPP (3rd Generation Partnership Project). Registration and updates of location information according to the conventional mobile communications system will be described based on these specifications. FIG. 5 is a sequence diagram showing operations of an attach process and location registration process in the conventional mobile communications system. In FIG. 5, the UE 1, radio access network device 2, MSC 33, and SGSN 35 are identical to those in FIG. 4. An attach process is the process of notifying a network (communications network) that the UE 1 is turned on and is receive-ready.

If the UE 1 is turned on in a location registration area or it is moved with its power off from a location registration area and turned on in a new location registration area (hereinafter these operations will be referred to collectively as an "Attach Request") or if the UE 1 is taken from a location registration area to a different location registration area (hereinafter this operation will be referred to as a "location registration request"), location information must be updated for mobility management in relation to each communications network—the fixed network/mobile communications network 4 and the Internet 5.

Referring to FIG. 5, first in a step S50, an RRC (Radio Resource Control) connection for radio communications is established between the UE 1 and radio access network device 2 (i.e., the RAN). This is a connection for radio communications between the UE 1 and radio access network device 2 and complies with a protocol which stipulates radio interfaces between UE 1 and radio access network devices 2 in Layer 3 (Network Layer) defined by the OSI (Open Systems Interconnection) model.

The process of establishing an RRC connection is started upon a request from an upper layer of the UE 1 or a call request from the communications network. In the case of a request from an upper layer of the UE 1, the process is started by an RRC Connection Request signal sent from the UE 1 to the radio access network device 2, RRC Connection Establishment signal sent from the radio access network device 2 to the UE 1, and RRC Connection Establishment Complete signal sent from the UE 1 to the radio access network device 2.

Next, in a step S51 of "Initial Direct Transfer [CS domain]", the UE 1 transmits a Location Update Request signal to the MSC 33, i.e., the CS domain 31 with circuit switching capabilities for the fixed network/mobile communications network 4, requesting the MSC 33 to update the location information for mobility management in the fixed network/mobile communications network 4. Then, in a step S52 of "Downlink Direct Transfer", the MSC 33 transmits a Location Update Accept signal to the UE 1, informing the UE 1 that the location information for mobility management in the fixed network/mobile communications network 4 has been updated.

Then, in a step S53 of "RRC Connection Release", the radio access network device 2 transmits an RRC Connection Release signal to the UE 1. After receiving the signal, the UE 1 transmits an RRC Connection Release Complete signal to the radio access network device 2 in a step S54, and each of the UE 1 and the radio access network device 2 enters an idle state.

Next, in order to update the location information for mobility management in the Internet 5, an RRC connection for radio communications is established again between the UE 1 and radio access network device 2 (i.e., the RAN) in a step S55. Then, in a step S56 of "Initial Direct Transfer [PS domain]", the UE 1 transmits an Attach Request signal to the SGSN 35, i.e., the PS domain 32 with packet switching capabilities for the Internet 5, requesting the SGSN 35 to update the location information for mobility management in the Internet 5. Then, in a step S57 of "Downlink Direct Transfer", the SGSN 35 transmits an Attach Accept signal to the UE 1, informing the UE 1 that the location information for mobility management in the Internet 5 has been updated.

Thereafter, in a step S58 of "RRC Connection Release", the radio access network device 2 transmits an RRC Connection Release signal to the UE 1. After receiving the signal, the UE 1 transmits an RRC Connection Release Complete signal to the radio access network device 2 in a step S59, and each of the UE 1 and the radio access network device 2 enters an idle state.

In this way, with the conventional mobile communications system described above, if an attach request or a location registration request is made for mobility management in the fixed network/mobile communications network 4 (CS domain 31) and mobility management in the Internet 5 (PS domain 32), mobility management information of only one domain is updated on an RRC connection between the UE 1 and radio access network (RAN) device 2 and the RRC connection is released once, upon completion of the update process. Then, an RRC connection is established again between the UE 1 and radio access network device 2, and mobility management information of further one domain is updated, and upon completion of the update process the RRC connection is released. That is, each RRC connection is used to update the location information for mobility management only in one domain.

However, in the conventional mobile communications system, when an RRC connection is established between the UE 1 and radio access network device 2, the location information for mobility management only in one domain is updated, specifically, a location registration process of IMSI (International Mobile Subscriber Identity) or GPRS (General Packet Radio Service) is performed. Consequently, location information is updated frequently. This presents a problem that while location information is being updated, the frequency of communication between the UE 1 and radio access network device 2 is increased, resulting in the inability to use radio waves (radio resources) efficiently.

particularly, the magnitude of the above problem depends on the size of the location registration area. That is, it is theoretically possible for the location registration area described above to cover the entire service area of the BTS 21 or to be divided into cells, the smallest unit. In such a case, too small location registration areas will cause the UE 1 to move among location registration areas frequently, increasing the number of attach requests or location registration requests made by the UE 1 and resulting in an increased number of updates to location information in the CN 3. Therefore, if mobility management information of only one domain is updated on an RRC connection, the frequency of communication between the UE 1 and radio access network device 2 will be increased, causing a problem of traffic congestion.

Furthermore, since the UE 1 judges whether it is located in the area within reach of radio waves from the BTS 21 by measuring the field strength of a control signal received from the BTS 21, if field strengths of received control signals around the boundary between areas formed by BTSs are intermingled, the UE 1 passing through the boundary will determine that it has moved into overlapping location registration areas of the BTSs and will make location registration requests one after another. In such a case, if mobility management information of only one domain is updated on an RRC connection, the frequency of communication between the UE 1 and radio access network device 2 will be increased, resulting in a waste of resources.

SUMMARY OF THE INVENTION

The present invention has been achieved to solve the above problems. Its object is to provide a mobile communications system, a communications control method, a mobile terminal device and a control method which can reduce the time required for an attach process or a location registration process and alleviate traffic congestion for effective use of resources by updating location information for mobility management in a circuit switched domain and location information for mobility management in a packet switched domain through an RRC connection once established between a mobile station and a radio access network.

According to the first aspect of the present invention, a mobile communications system which comprises a mobile terminal device and a switching center having a circuit switched domain and a packet switched domain and carrying out location management of said mobile terminal device and establishes a radio connection (hereinafter referred to as an RRC (Radio Resource Control) connection) for communications with said mobile terminal device in response to an attach process or location registration process on said mobile terminal device, wherein messages are transmitted and received between said mobile terminal device and each of said circuit switched domain and said packet switched domain through said RRC connection for said attach process or said location registration process.

According to the second aspect of the present invention, a communications control method for a mobile communications system which comprises a mobile terminal device and a switching center having a circuit switched domain and a packet switched domain and carrying out location management of said mobile terminal device and establishes a radio connection (hereinafter referred to as an RRC (Radio Resource Control) connection) for communications with said mobile terminal device in response to an attach process or location registration process on said mobile terminal device, wherein said method comprises a message transmission/reception step of transmitting and receiving messages between said mobile terminal device and each of said circuit switched domain and said packet switched domain through said RRC connection for said attach process or said location registration process.

According to the third aspect of the present invention, a mobile terminal device in a mobile communications system which comprises the mobile terminal device and a switching center having a circuit switched domain and a packet switched domain and carrying out location management of said mobile terminal device and establishes a radio connection (hereinafter referred to as an RRC (Radio Resource Control) connection) for communications with the mobile terminal device in response to an attach process or location registration process on the mobile terminal device, wherein the mobile terminal device transmits and receives messages through said RRC connection with said circuit switched domain and said packet switched domain for said attach process or said location registration process.

According to the fourth aspect of the present invention, a recording medium containing a program for making a computer control the operation of a mobile terminal device in a mobile communications system which comprises the mobile terminal device and a switching center having a circuit switched domain and a packet switched domain and carrying out location management of said mobile terminal device and establishes a radio connection (hereinafter referred to as an RRC (Radio Resource Control) connection) for communications with said mobile terminal device in response to an attach process or location registration process on said mobile terminal device, wherein said program contains a message transmission/reception process of transmitting and receiving messages between said mobile terminal device and each of said circuit switched domain and said packet switched domain through said RRC connection for said attach process or said location registration process.

According to the fifth aspect of the present invention, a control method for a mobile terminal device in a mobile communications system which comprises the mobile terminal device and a switching center having a circuit switched domain and a packet switched domain and carrying out location management of said mobile terminal device and establishes a radio connection (hereinafter referred to as an RRC (Radio Resource Control) connection) for communications with said mobile terminal device in response to an attach process or location registration process on said mobile terminal device, comprising a message transmission/reception step of transmitting and receiving messages between said mobile terminal device and each of said circuit switched domain and said packet switched domain through said RRC connection for said attach process or said location registration process.

Now, operation of the present invention will be described. When an attach process or location registration process takes place on a mobile terminal device, creating a need to update location information for mobility management in each of a circuit switched domain and a packet switched domain, messages about the attach process or location registration process are transmitted from the mobile terminal to the circuit switched domain and packet switched domain of a core network through an RRC connection established between the mobile terminal and a radio access network. This makes it possible to update the location information for mobility management in each of both domains through the RRC connection once established, thereby reducing the time required for an attach process or a location registration process and alleviating traffic congestion. Here, the messages may be transmitted through the RRC connection to the circuit switched domain and the packet switched domain either simultaneously or in sequence.

DESCRIPTION OF THE PREFERRED EMBODIMENTS

Figure 4:
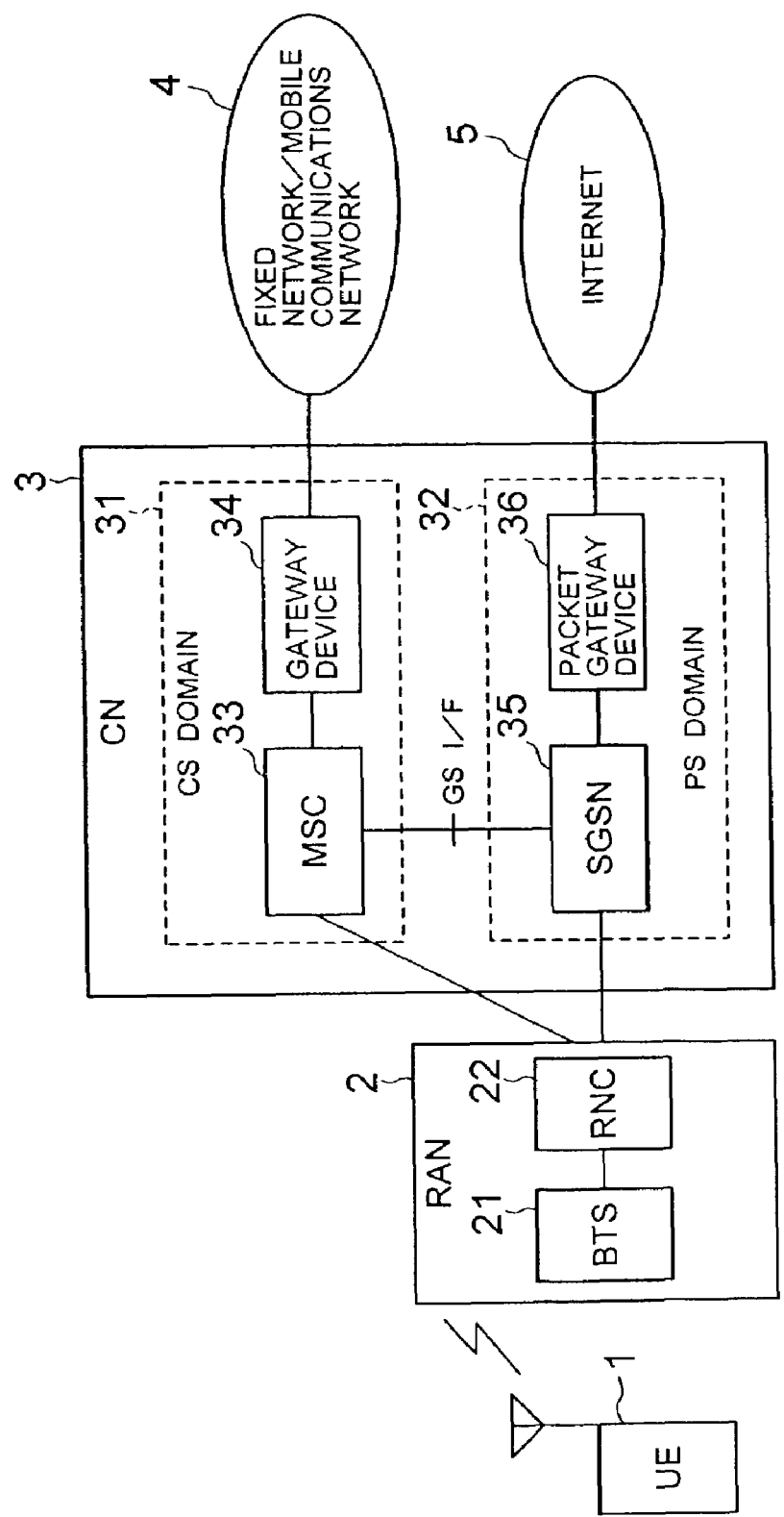
FIG. 4 is a block diagram showing a configuration of a W-CDMA mobile communications system.
Figure 5:
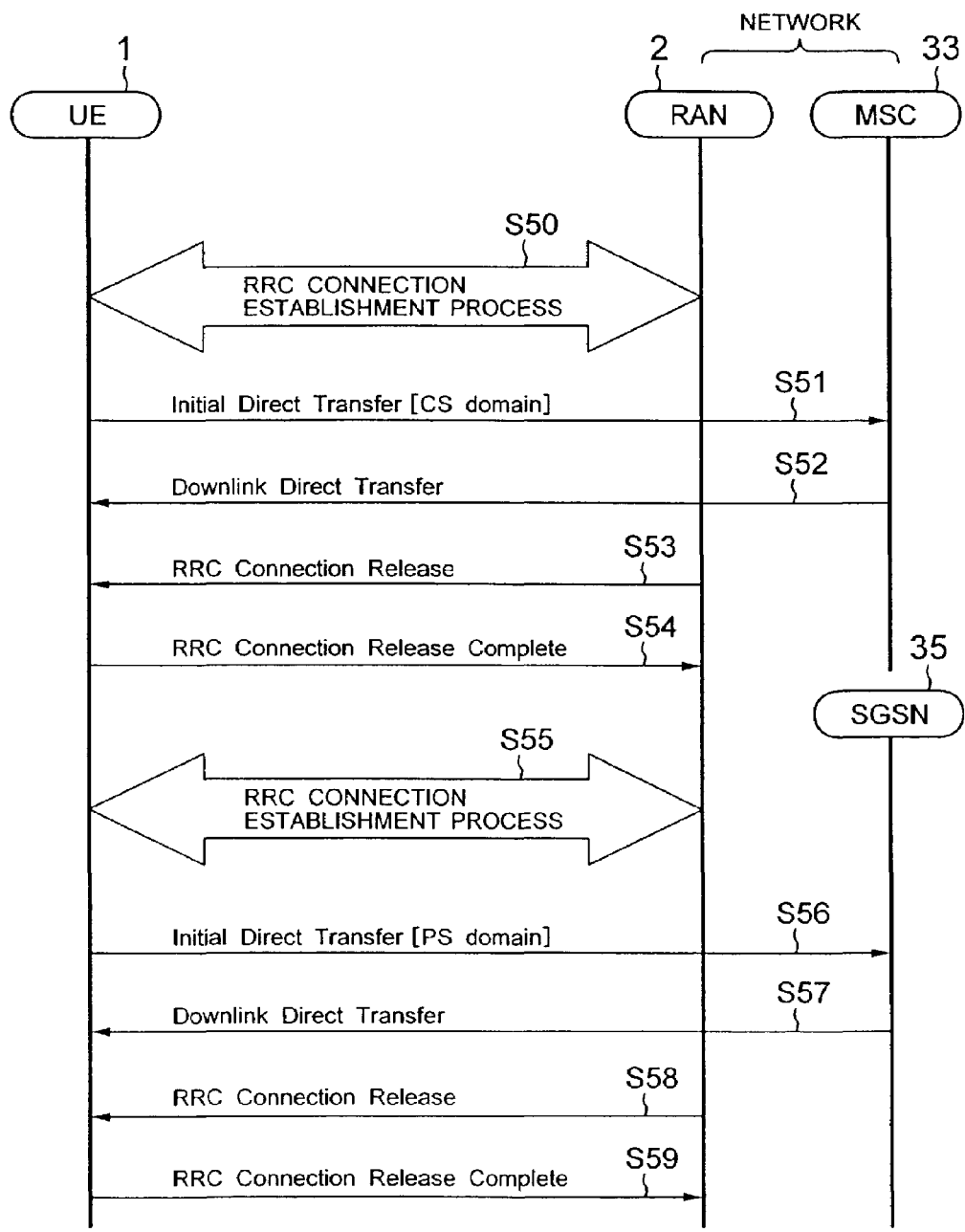
FIG. 5 is a sequence diagram showing operation of an attach process or a location registration process in a conventional mobile communications system.

Preferred embodiments of the present invention will be described below with reference to the accompanying drawings. A configuration of a W-CDMA mobile communications system according to an embodiment of the present invention is shown in FIG. 4. A radio access network device 2, CN 3, a fixed network/mobile communications network 4, and an Internet 5 shown in FIG. 4 are basically the same as those of the conventional mobile communications system described above, and thus description thereof will be omitted to avoid redundancy. Regarding a UE 1 (see FIG. 4) in the mobile communications system according to the embodiment of the present invention, its internal configuration is shown in FIG. 1.

Figure 1:
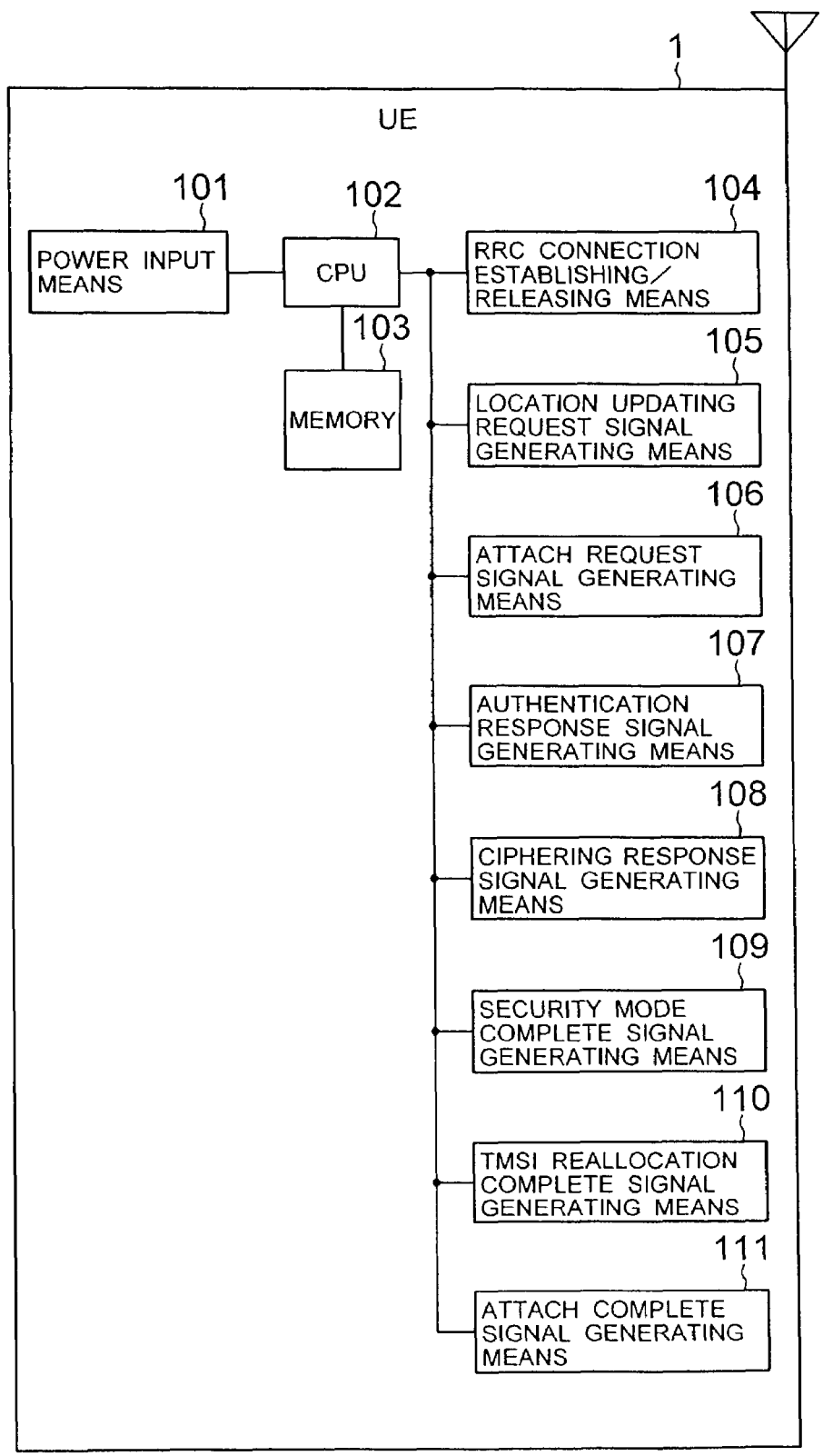
FIG. 1 is a block diagram showing a configuration of a mobile station according to an embodiment of the present invention.

In FIG. 1, the UE 1 comprises power input means 101, a CPU (Central Processing Unit) 102 for overall control, a memory 103, RRC connection establishing/releasing means 104, location updating request signal generating means 105, attach request signal generating means 106, authentication response signal generating means 107, ciphering response signal generating means 108, security mode complete signal generating means 109, TMSI reallocation complete signal generating means 110, and attach complete signal generating means 111. A radio transmitter/receiver for W-CDMA communications with a BTS 21, a control panel for selecting dials and functions, and a display are not shown in FIG. 1.

Operations of the RRC connection establishing/releasing means 104, location updating request signal generating means 105, attach request signal generating means 106, authentication response signal generating means 107, ciphering response signal generating means 108, security mode complete signal generating means 109, TMSI reallocation complete signal generating means 110, and attach complete signal generating means 111 are all controlled by the CPU 102.

Figure 2:
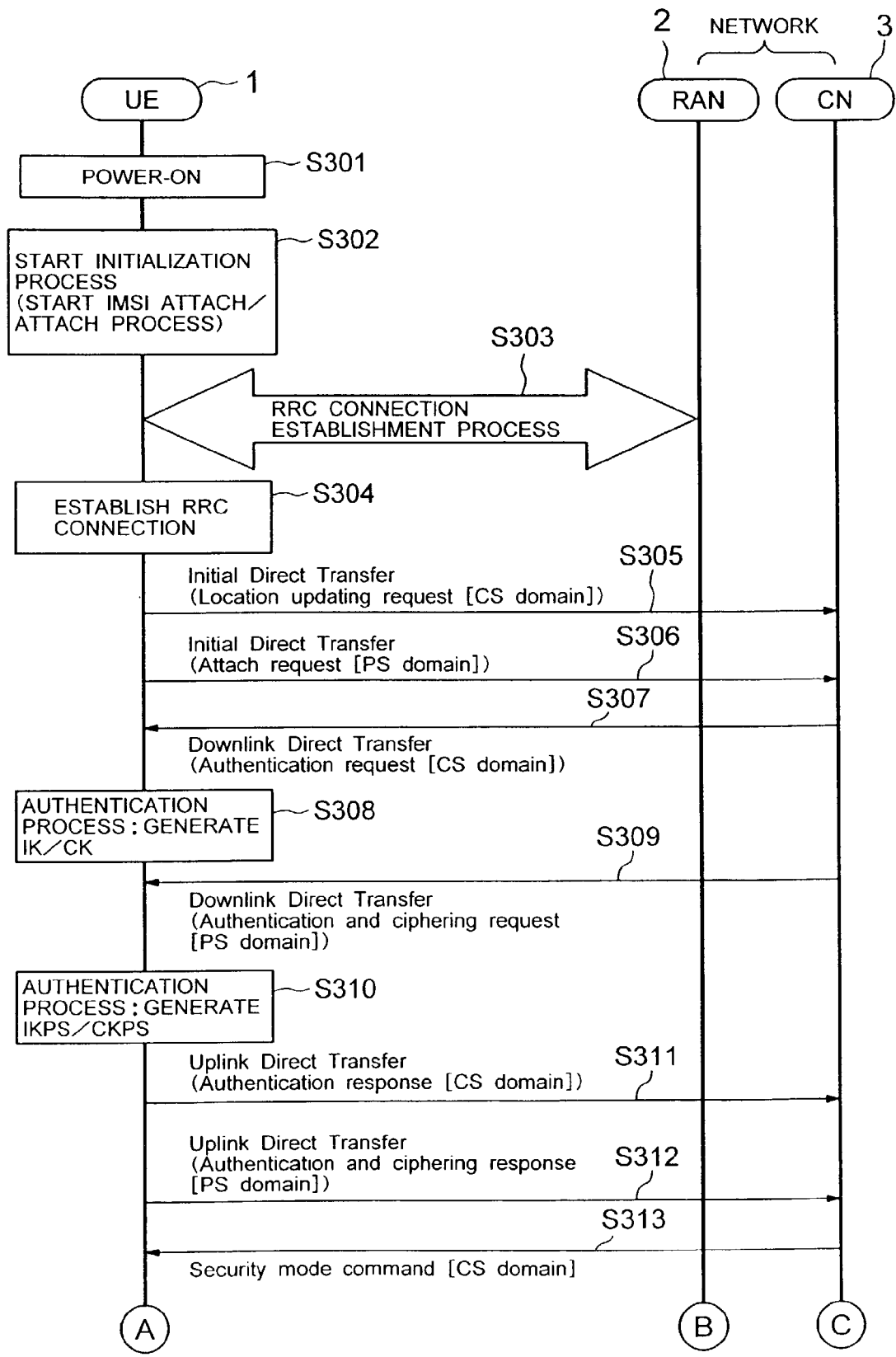
FIG. 2 is a sequence diagram showing operation of an attach process or a location registration process in a mobile communications system according to the embodiment of the present invention.
Figure 3:
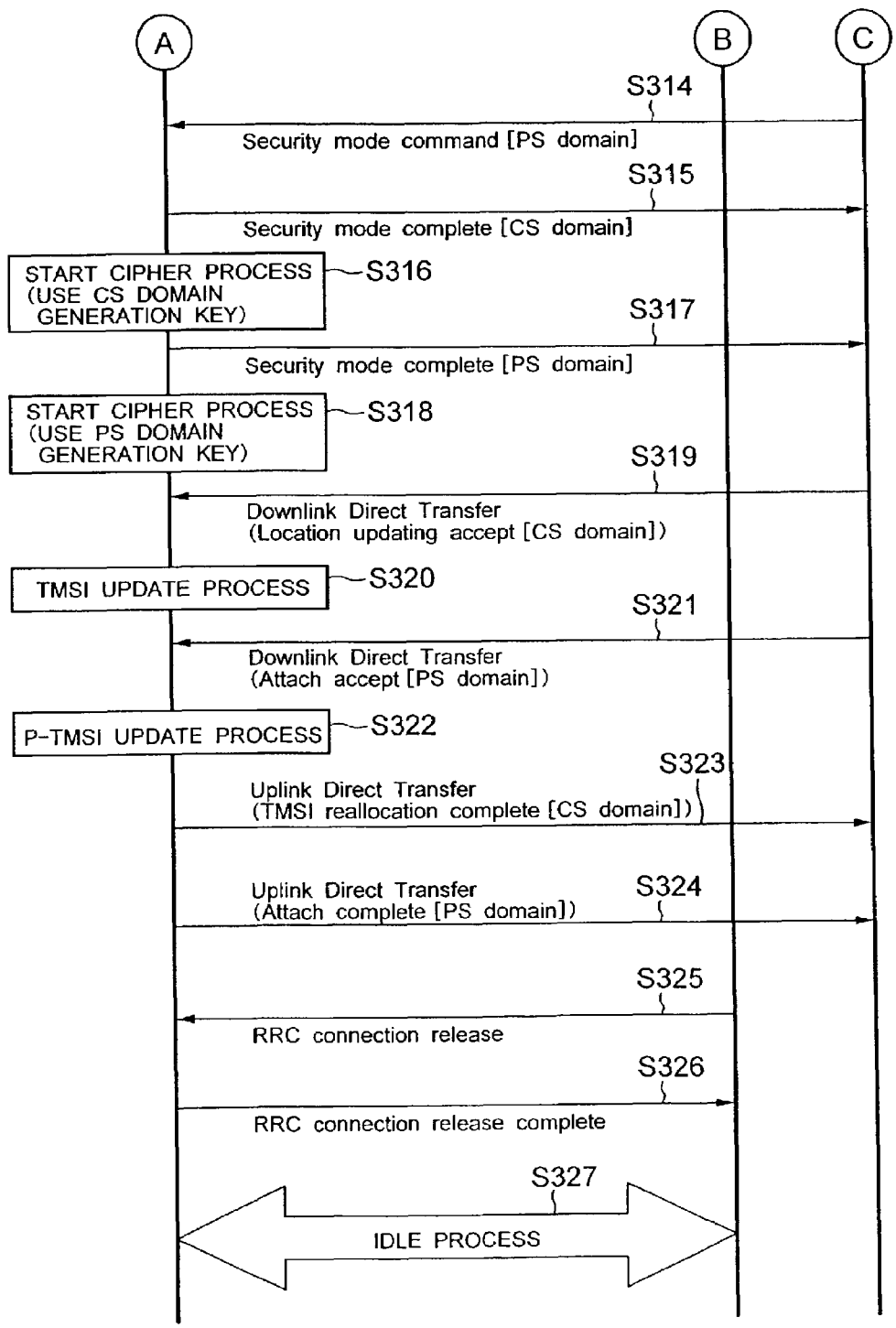
FIG. 3 is a sequence diagram showing operation of the attach process or the location registration process in the mobile communications system according to the embodiment of the present invention.

Next, an operation of the mobile communications system according to the embodiment of the present invention will be described in detail. FIGS. 2 and 3 are sequence diagrams showing operation of an attach process or location registration process in the mobile communications system according to the embodiment of the present invention. The UE 1, radio access network device 2, and CN 3 in FIGS. 2 and 3 are identical to those of the mobile communications system shown in FIG. 4.

The attach process means the process of notifying the network (communications network), specifically the CN 3, that the UE 1 is turned on and is receive-ready, as described above. The location registration process means the process of providing location information of the location registration area in which the UE 1 is located to the CN 3 which carries out mobility management.

That is, FIGS. 2 and 3 show operations performed when an attach process or location registration process takes place on the UE 1 and location information for mobility management is simultaneously updated in a circuit switched (CS) domain 31 with circuit switching capabilities for the fixed network/mobile communications network 4 and packet switched (PS) domain 32 with packet switching capabilities for the Internet 5.

Referring to FIG. 2, first in a step S301, as the UE 1 is turned on by the power input means 101 shown in FIG. 1, the CPU 102 is given notice to that effect, and then an initialization process of the UE 1 is started in a step S302. This initiates an attach process, and preparations are made to notify the radio access network device 2 about the IMSI (International Mobile Subscriber Identity) of the UE 1. All this while, the UE 1 remains idle.

Next, in a step S303, the RRC connection establishing/releasing means 104 performs an RRC connection establishment process of establishing an RRC connection between the UE 1 and radio access network device 2 (i.e., the RAN) for radio communications. Then, in a step S304, the RRC connection is established on the UE 1. In other words, as a radio interface is set up between the UE 1 and radio access network device 2, it becomes possible to transmit and receive messages between the UE 1 and CN 3.

Then, in a step S305 of "Initial Direct Transfer (Location Updating Request [CS domain])", the UE 1 transmits a Location Updating Request signal generated by the location updating request signal generating means 105 to the MSC 33, i.e., the CS domain 31 which has circuit switching capabilities for the fixed network/mobile communications network 4.

Next, in a step S306 of "Initial Direct Transfer (Attach Request [PS domain])", the UE 1 transmits an Attach Request signal generated by the attach request signal generating means 106 to the SGSN 35, i.e., the PS domain 32 which has packet switching capabilities for the Internet 5.

Then, in a step S307 of "Downlink Direct Transfer (Authentication Request [CS domain])", the MSC 33 transmits an Authentication Request signal to the UE 1. In response, in a step S308, the UE 1 carries out an authentication process and generates an IK/CK (Integrity Key/Cipher Key), which is an authentication key for the CS domain 31.

Next, in a step S309 of "Downlink Direct Transfer (Authentication And Ciphering Request [PS domain])", the SGSN 35 transmits an Authentication And Ciphering Request signal to the UE 1. In response, in a step S310, the UE 1 carries out an authentication process and generates an IKPS/CKPS (Integrity Key Packet Switched/Cipher Key Packet Switched), which is an authentication key for the PS domain 32.

When the UE 1 has generated the authentication keys, it transmits, in a step S311 of "Uplink Direct Transfer (Authentication Response [CS domain])", an Authentication Response signal generated by the authentication response signal generating means 107 to the MSC 33. Then, in a step S312 of "Uplink Direct Transfer (Authentication and Ciphering Response [PS domain])", the UE 1 sends the SGSN 35 an Authentication Response signal and Ciphering Response signal generated by the authentication response signal generating means 107 and ciphering response signal generating means 108, respectively. Then, in a step S313 of "Security Mode Command [CS domain])" and step S314 of "Security Mode Command [PS domain])", the MSC 33 and SGSN 35 transmit Security Mode Command (Cipher Process Request) signals to the UE 1.

Then, in a step S315 of "Security Mode Complete [CS domain]", the UE 1 transmits a Security Mode Complete signal generated by the security mode complete signal generating means 109 to the MSC 33. In response, in a step S316, the UE 1 starts a cipher process and generates a cipher key for use in the CS domain 31 after an idle process.

Then, in a step S317 of "Security Mode Complete [PS domain]", the UE 1 transmits a Security Mode Complete signal generated by the security mode complete signal generating means 109 to the SGSN 35. In response, in a step S318, the UE 1 starts a cipher process and generates a cipher key for use in the PS domain 32 after the idle process.

Then, in a step S319 of "Downlink Direct Transfer (Location Updating Accept [CS domain])", the MSC 33 transmits a Location Updating Accept signal to the UE 1. In response, the UE 1 performs an update process of a mobile subscriber ID in a step S320 to update a TMSI (Temporary Mobile Subscriber Identity) for user identification allocated by the CS domain 31.

Then, in a step S321 of "Downlink Direct Transfer (Attach Accept [PS domain])", the SGSN 35 transmits an Attach Accept signal to the UE 1. In response, the UE 1 performs an update process of a mobile subscriber ID in a step S322 to update a P-TMSI (Packet-switched Temporary Mobile Subscriber Identity) for user identification allocated by the PS domain 32.

When the UE 1 has updated the mobile subscriber IDs, it transmits, in a step S323 of "Uplink Direct Transfer (TMSI Reallocation Complete [CS domain])", a TMSI Reallocation Complete signal generated by the TMSI reallocation complete signal generating means 110 to the MSC 33. Then, in a step S324 of "Uplink Direct Transfer (Attach Complete [PS domain])", the UE 1 transmits an Attach Complete signal generated by the attach complete signal generating means 111 to the SGSN 35. This ends the processes of updating the location information for mobility management in each of the CS domain 31 and PS domain 32 in relation to the attach process or location registration process which took place on the UE 1.

Then, in a step S325 of "RRC Connection Release", the radio access network device 2 transmits an RRC Connection Release signal to the UE 1. After receiving the signal, the UE 1 transmits an RRC Connection Release Complete signal generated by the RRC connection establishing/releasing means 104 to the radio access network device 2 in a step S326, and each of the UE 1 and the radio access network device 2 enters an idle state in a step S327.

As described above, in the mobile communications system according to the embodiment of the present invention, when an attach process or location registration process takes place on the UE, creating a need to update location information for mobility management in each of the circuit switched network and the packet switched network, messages about the attach process or location registration process are transmitted to the CS domain and the PS domain through a single RRC connection established between the UE and radio access network device, thereby reducing the time required to update location information for mobility management in each of the networks.

In FIGS. 2 and 3, all the processes performed by the UE 1 are controlled by the CPU 102 in the UE 1 and a program which runs all these processes is stored in the memory 103 of the UE 1 in a form readable by the CPU 102.

Also, according to FIGS. 2 and 3, in the messages sent from the UE 1 to the CN 3 or the messages sent from the CN 3 to the UE 1, the signal for the CS domain 31 is transmitted first and then the signal for the PS domain 32 is transmitted. However, the present invention is not limited to this and it is also possible to transmit the signal for the PS domain 32 first and then transmit the signal for the CS domain 31.

Incidentally, through the RRC connection established between the UE and radio access network device, the communications network (CN) delivers basic information to all UEs which exist in the service areas. This information is referred to as system information and contains system information elements. These elements contain NMO (Network Mode of Operation: indicates whether a GS interface is provided between the MSC 33 and SGSN 35).

The GS interface is an interface (GS I/F) provided between the MSC 33 and SGSN 35 as shown in FIG. 4 and which couples the CS domain 31 and PS domain 32.

That is, the system information delivered from the CN 3 through the RRC connection allows the UE 1 to judge whether a GS interface is provided in the CN 3. If the NMO shows that a GS interface is provided, a message addressed to the CS domain 31 and a message addressed to the PS domain 32 can be transmitted together simultaneously from the UE 1 to the CN 3.

Specifically, in FIGS. 2 and 3, it is possible to perform a combined process of transmitting the Location Updating Request signal addressed to the CS domain 31 (Step S305) by including it in the Attach Request signal addressed to the PS domain 32 (Step S306). This makes it possible to further reduce the time required to update location information for mobility management in each of the networks.

However, in the case of Mode II in which no GS interface is provided between the MSC and SGSN according to the Network Operation Mode for UMTS (Universal Mobile Telecommunications System: European version of IMT-2000) which has been stipulated by 3PPG TS 23.060, Combined Procedure by MT (Mobile terminal) which allows for combination between the MSC and SGSN is disabled (No), and thus a message addressed to the CS domain 31 and a message addressed to the PS domain 32 cannot be transmitted together simultaneously from the UE 1 to the CN 3.

In such a case, messages about an attach process or location registration process must be transmitted separately to the CS domain 31 and PS domain 32 as shown in FIGS. 2 and 3.

In the embodiment described above, the above-mentioned messages addressed to the CS domain and PS domain may be transmitted through an RRC connection either simultaneously or in sequence.

As described above, according to the present invention, since messages about an attach process or location registration process are transmitted to the CS domain and PS domain through an RRC connection, location information for mobility management in each of the networks can be updated in a short time. Also, traffic congestion between the mobile station and the radio access network is alleviated and effective use of resources is realized.

What is claimed is:

1. A mobile communications system which comprises:
a mobile terminal device; and
a switching center including a circuit switched domain and packet switched domain, said switching center performing location management of said mobile terminal device and establishing Radio Resource Control (RRC) connection for communications with said mobile terminal device in response to an attach process or location registration process on said mobile terminal device,
wherein messages are transmitted and received between said mobile terminal device and each of said circuit switched domain and said packet switched domain through said RRC connection for said attach process or said location registration process,
wherein said messages include a Location Updating Request signal sent from said mobile terminal device to said circuit switched domain and an Attach Request signal sent from said mobile terminal device to said packet switched domain.

2. The mobile communications system according to claim 1, wherein the message addressed to said circuit switched domain and the message addressed to said packet switched domain are transmitted from said mobile terminal either simultaneously or in sequence, and the messages addressed to said mobile terminal device are transmitted from said circuit switched domain and said packet switched domain either simultaneously or in sequence.

3. The mobile communications system according to claim 1, wherein said messages include an Authentication Request signal sent from said circuit switched domain to said mobile terminal device and an Authentication And Ciphering Request signal sent from said packet switched domain to said mobile terminal device.

4. The mobile communications system according to claim 3, wherein said messages include a reply signal sent from said mobile terminal device to said circuit switched domain in response to said Authentication Request signal and a reply signal sent from said mobile terminal device to said packet switched domain in response to said Authentication And Ciphering Request signal.

5. The mobile communications system according to claim 4, wherein said messages include Security Mode Command signals sent from said circuit switched domain and said packet switched domain to said mobile terminal device.

6. The mobile communications system according to claim 5, wherein said messages include Security Mode Complete signals sent from said mobile terminal device to said circuit switched domain and said packet switched domain in response to said Security Mode Command signals.

7. The mobile communications system according to claim 6, wherein said messages include a Location Updating Accept signal sent from said circuit switched domain to said mobile terminal device and an Attach Accept signal sent from said packet switched domain to said mobile terminal device.

8. The mobile communications system according to claim 7, wherein said messages include a TMSI Reallocation Complete signal sent from said mobile terminal device to said circuit switched domain and an Attach Complete signal sent from said mobile terminal device to said packet switched domain.

9. The mobile communications system according to claim 1, wherein said RRC connection is released after said attach process or said location registration process is complete.

10. The mobile communications system according to claim 1, wherein said switching center further has an interface between said circuit switched domain and said packet switched domain, and the message addressed to said circuit switched domain and the message addressed to said packet switched domain are transmitted together simultaneously from said mobile terminal device.

11. The mobile communications system according to claim 1, further comprising a radio access network device between said switching center and said mobile terminal device,
wherein said RRC connection is established between said mobile terminal device and said radio access network device.

12. A communications control method for a mobile communications system which comprises a mobile terminal device and a switching center including a circuit switched domain and packet switched domain, said switching center performing location management of said mobile terminal device and establishing Radio Resource Control (RRC) connection for communications with said mobile terminal device in response to an attach process or location registration process on said mobile terminal device, wherein said method comprises a message transmission/reception step of transmitting and receiving messages between said mobile terminal device and each of said circuit switched domain and said packet switched domain through said RRC connection for said attach process or said location registration process, wherein said message transmission/reception step comprises a step of transmitting a Location Updating Request signal from said mobile terminal device to said circuit switched domain and an Attach Request signal from said mobile terminal device to said packet switched domain.

13. The communications control method according to claim 12, wherein said message transmission/reception step transmits the message addressed to said circuit switched domain and the message addressed to said packet switched domain from said mobile terminal device either simultaneously or in sequence, and transmits the messages addressed to said mobile terminal device from said circuit switched domain and said packet switched domain either simultaneously or in sequence.

14. The communications control method according to claim 12, wherein said message transmission/reception step comprises a step of transmitting an Authentication Request signal from said circuit switched domain to said mobile terminal device and an Authentication And Ciphering Request signal from said packet switched domain to said mobile terminal device.

15. The communications control method according to claim 14, wherein said message transmission/reception step comprises a step of transmitting a reply signal from said mobile terminal device to said circuit switched domain in response to said Authentication Request signal and transmitting a reply signal from said mobile terminal device to said packet switched domain in response to said Authentication And Ciphering Request signal.

16. The communications control method according to claim 15, wherein said message transmission/reception step comprises a step of transmitting Security Mode Command signals from said circuit switched domain and said packet switched domain to said mobile terminal device.

17. The communications control method according to claim 16, wherein said message transmission/reception step comprises a step of transmitting Security Mode Complete signals from said mobile terminal device to said circuit switched domain and said packet switched domain in response to said Security Mode Command signals.

18. The communications control method according to claim 17, wherein said message transmission/reception step comprises a step of transmitting a Location Updating Accept signal from said circuit switched domain to said mobile terminal device and an Attach Accept signal from said packet switched domain to said mobile terminal device.

19. The communications control method according to claim 18, wherein said message transmission/reception step comprises a step of transmitting a TMSI Reallocation Complete signal from said mobile terminal device to said circuit switched domain and an Attach Complete signal from said mobile terminal device to said packet switched domain.

20. The communications control method according to claim 12, comprising a step of releasing said RRC connection after said attach process or said location registration process is complete.

21. The communications control method according to claim 12, wherein if said switching center has an interface between said circuit switched domain and said packet switched domain, said message transmission/reception step transmits the message addressed to said circuit switched domain and the message addressed to said packet switched domain together simultaneously from said mobile terminal device.

22. The communications control method according to claim 12, wherein said RRC connection is established between said mobile terminal device and a radio access network device, which is provided between said switching center and said mobile terminal device.

23. A mobile terminal device in a mobile communications system which comprises the mobile terminal device and a switching center including a circuit switched domain and a packet switched domain, said switching center performing location management of said mobile terminal device and establishing a Radio Resource Control (RRC) connection for communications with the mobile terminal device in response to an attach process or location registration process on the mobile terminal device, wherein the mobile terminal device transmits and receives messages through said RRC connection with said circuit switched domain and said packet switched domain for said attach process or said location registration process, wherein said messages include a Location Updating Request signal to said circuit switched domain and an Attach Request signal to said packet switched domain.

24. The mobile terminal device according to claim 23, wherein the message addressed to said circuit switched domain and the message addressed to said packet switched domain are transmitted from the mobile terminal device either simultaneously or in sequence, and the messages addressed to the mobile terminal device are transmitted from said circuit switched domain and said packet switched domain either simultaneously or in sequence.

25. The mobile terminal device according to claim 23 wherein said messages include a reply signal to an Authentication Request signal sent from said circuit switched domain and a reply signal to an authentication and ciphering request sent from said packet switched domain.

26. The mobile terminal device according to claim 25, wherein said messages include Security Mode Complete signals sent from the mobile terminal device in response to Security Mode Command signals sent from said circuit switched domain and said packet switched domain.

27. The mobile terminal device according to claim 26, wherein said messages include a TMSI Reallocation Complete signal sent from the mobile terminal device in response to a Location Updating Accept signal sent from said circuit switched domain and an Attach Complete signal sent from the mobile terminal device in response to an Attach Accept signal sent from said packet switched domain.

28. The mobile terminal device according to claim 23, wherein said RRC connection is released after said attach process or said location registration process is complete.

29. The mobile terminal device according to claim 23, wherein if said switching center has an interface between said circuit switched domain and said packet switched domain, the mobile terminal device transmits the message addressed to said circuit switched domain and the message addressed to said packet switched domain together simultaneously.

30. The mobile terminal device according to claim 23, wherein said RRC connection is established between said mobile terminal device and a radio access network device, which is provided between said switching center and said mobile terminal device.

31. A recording medium containing a program for making a computer control the operation of a mobile terminal device in a mobile communications system which comprises the mobile terminal device and a switching center including a circuit switched domain and a packet switched domain, said switching center performing location management of said mobile terminal device and establishing a Radio Resource Control (RRC) connection for communications with said mobile terminal device in response to an attach process or location registration process on said mobile terminal device, wherein said program contains a message transmission/reception process of transmitting and receiving messages between said mobile terminal device and each of said circuit switched domain and said packet switched domain through said RRC connection for said attach process or said location registration process, wherein said message transmission/reception process comprises a process of transmitting a Location Updating Request signal to said circuit switched domain and an Attach Request signal to said packet switched domain.

32. The recording medium according to claim 31, wherein said message transmission/reception process transmits the message addressed to said circuit switched domain and the message addressed to said packet switched domain either simultaneously or in sequence, and receives the messages transmitted from said circuit switched domain and said packet switched domain either simultaneously or in sequence.

33. The recording medium according to claim 31 wherein said message transmission/reception process comprises a process of transmitting a reply signal to an Authentication Request signal sent from said circuit switched domain and a reply signal to an authentication and ciphering request sent from said packet switched domain.

34. The recording medium according to claim 33, wherein said message transmission/reception process comprises a process of transmitting Security Mode Complete signals in response to Security Mode Command signals sent from said circuit switched domain and said packet switched domain.

35. The recording medium according to claim 34, wherein said message transmission/reception process comprises a process of transmitting a TMSI Reallocation Complete signal in response to a Location Updating Accept signal sent from said circuit switched domain and an Attach Complete signal in response to an Attach Accept signal sent from said packet switched domain.

36. The recording medium according to claim 31, wherein said program further comprises a process of releasing said RRC connection after said attach process or said location registration process is complete.

37. The recording medium according to claim 31, wherein if said switching center has an interface between said circuit switched domain and said packet switched domain, said message transmission/reception process transmits the message addressed to the circuit switched domain and the message addressed to said packet switched domain together simultaneously.

38. A control method for a mobile terminal device in a mobile communications system which comprises the mobile terminal device and a switching center including a circuit switched domain and a packet switched domain, said switching center performing location management of said mobile terminal device and establishing a Radio Resource Control (RRC) connection for communications with said mobile terminal device in response to an attach process or location registration process on said mobile terminal device, said control method comprising:

a message transmission/reception step of transmitting and receiving messages between said mobile terminal device and each of said circuit switched domain and said packet switched domain through said RRC connection for said attach process or said location registration process, wherein said message transmission/reception step comprises a step of transmitting a Location Updating Request signal to said circuit switched domain and an Attach Request signal to said packet switched domain.

39. The control method according to claim 38, wherein said message transmission/reception step transmits the message addressed to said circuit switched domain and the message addressed to said packet switched domain either simultaneously or in sequence, and receives the messages transmitted from said circuit switched domain and said packet switched domain either simultaneously or in sequence.

40. The control method according to claim 38, wherein said message transmission/reception step comprises a step of transmitting a reply signal to an Authentication Request signal sent from said circuit switched domain and a reply signal to an authentication and ciphering request sent from said packet switched domain.

41. The control method according to claim 40, wherein said message transmission/reception step comprises a step of transmitting Security Mode Complete signals in response to Security Mode Command signals sent from said circuit switched domain and said packet switched domain.

42. The control method according to claim 41, wherein said message transmission/reception step comprises a step of transmitting a TMSI Reallocation Complete signal in response to a Location Updating Accept signal sent from said circuit switched domain and an Attach Complete signal in response to an Attach Accept signal sent from said packet switched domain.

43. The control method according to claim 38, further comprising a step of releasing said RRC connection after said attach process or said location registration process is complete.

44. The control method according to claim 38, wherein if said switching center has an interface between said circuit switched domain and said packet switched domain, said message transmission/reception step transmits the message addressed to said circuit switched domain and the message addressed to said packet switched domain together simultaneously.

* * * * *